(12) United States Patent
Garavito et al.

(10) Patent No.: US 10,112,110 B1
(45) Date of Patent: Oct. 30, 2018

(54) INITIATING A GAME SESSION WITH BROADCAST SUBSCRIBERS

(71) Applicant: Amazon Technologies, Inc., Seattle, WA (US)

(72) Inventors: Javier Justino Garavito, Mercer Island, WA (US); Stephen Gordon Dewhurst, Seattle, WA (US); Jeremiah William Habets, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 349 days.

(21) Appl. No.: 15/085,722

(22) Filed: Mar. 30, 2016

(51) Int. Cl.
*A63F 13/35* (2014.01)
*H04L 29/06* (2006.01)

(52) U.S. Cl.
CPC .......... *A63F 13/35* (2014.09); *H04L 65/4076* (2013.01); *H04L 67/42* (2013.01)

(58) Field of Classification Search
CPC ...... A63F 13/35; H04L 65/4076; H04L 67/42
See application file for complete search history.

(56) References Cited

U.S. PATENT DOCUMENTS

| | | | | |
|---|---|---|---|---|
| 5,586,257 A | * | 12/1996 | Perlman | A63F 13/12 463/23 |
| 5,828,843 A | * | 10/1998 | Grimm | G06F 9/5027 709/228 |
| 2004/0002384 A1 | * | 1/2004 | Multerer | A63F 13/12 463/42 |
| 2007/0155506 A1 | * | 7/2007 | Malik | A63F 13/12 463/42 |
| 2010/0304860 A1 | * | 12/2010 | Gault | A63F 13/10 463/31 |
| 2013/0130784 A1 | * | 5/2013 | Kofman | G07F 17/323 463/25 |
| 2014/0213353 A1 | * | 7/2014 | Lee | A63F 13/12 463/31 |
| 2015/0018094 A1 | * | 1/2015 | Watari | A63F 13/355 463/31 |
| 2015/0038234 A1 | * | 2/2015 | Bojorquez | A63F 13/795 463/42 |
| 2017/0076553 A1 | * | 3/2017 | Washington | G07F 17/3276 |
| 2018/0001209 A1 | * | 1/2018 | Verfaillie | A63F 13/35 |

* cited by examiner

*Primary Examiner* — Corbett B Coburn
(74) *Attorney, Agent, or Firm* — Baker & Hostetler LLP

(57) ABSTRACT

Automated initiation of game sessions between a game player and subscribers to the game player's streamed output is disclosed. A content item server receives a request to initiate a game session from a particular game player. The content item server communicates the request to a streaming server which references a database to identify streaming subscribers who receive streaming output of games played by the particular game player. The streaming server communicates a notification to the streaming clients for the identified streaming subscribers. In response to receiving acceptances from particular subscribers, the streaming server communicates information identifying the accepting subscribers to the game server which creates a game session and adds the accepting subscribers to the game session. The streaming server communicates instructions to the streaming clients of the accepting subscribers to launch game clients and log in the subscribers to the designated game session.

20 Claims, 10 Drawing Sheets

FIG. 2

| Game Player Table 210 | | | | |
|---|---|---|---|---|
| Game Account ID 220 | Start Date 222 | Games Played 224 | Game Score 226 | Time Played 228 |
| | | | | |

| Session Table 230 | | | | |
|---|---|---|---|---|
| Session ID 232 | Meeting Area 234 | Game Account ID 236 | Score 238 | Time Played 240 |
| | | | | |

Streaming Subscriber Table 310

| Streaming Account ID 320 | Start Date 322 | Games Streamed 324 | Stream Time 326 |
|---|---|---|---|
| | | | |

Streaming Information Table 330

| Streaming Account ID 332 | Game ID 334 | Game Account ID 336 | Game Session ID 338 | Subscriber Game Account ID 340 | Installed 342 |
|---|---|---|---|---|---|
| | | | | | |

FIG. 3

INITIATING A GAME SESSION WITH BROADCAST SUBSCRIBERS

BACKGROUND

In the on-line gaming environment, persons other than those participating in a game are often interested in viewing the play between game participants. Specialized systems have been developed that broadcast streams of game play to non-participants. Such broadcast streaming systems allow non-participants to view the playing of a game involving particular persons and/or a particular game. For example, a frequent player of a particular on-line game may request to receive a stream of the output of games played by a particular player who may be, for example, an acquaintance, friend, or regular game competitor. When the acquaintance or friend participates in a game, the person who has requested to view the game play receives an output stream of the playing of the game.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

FIG. 2 depicts example tables illustrating data stored in an example database.

FIG. 3 depicts example tables illustrating data stored in an example database.

DETAILED DESCRIPTION

Figure 1:
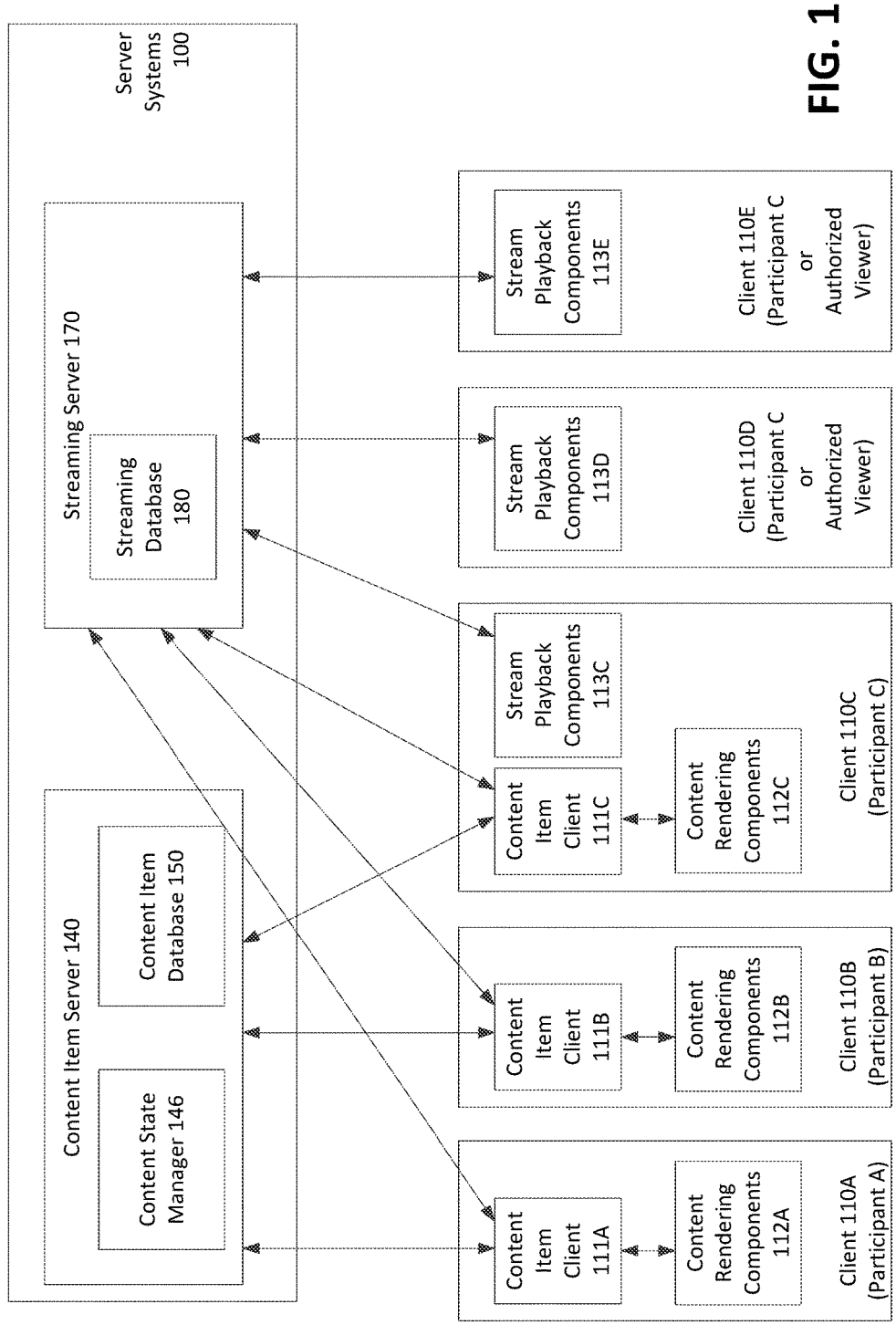
FIG. 1 depicts an example computing environment for content item distribution and output streaming.

The development of systems adapted to broadcast output streams of games has resulted in scenarios where multiple persons, and in some instances many persons, request to view or subscribe to receive streamed output of game playing of a particular player. Indeed, a single game player may have hundreds of persons who subscribe to receive streamed output of games participated in by the particular game player.

In some circumstances, a person may be interested in playing a game with individuals who subscribe to watch the person's game play. For example, a person may wish to have one or more friends who subscribe to the person's game feed added to the actual game. In a scenario where a particular game player has a large number of people who subscribe to the game player's game broadcasts, the game player may wish to further engage her audience of subscribers by inviting a few of her subscribers to actually play the game with her.

Existing systems lack automated mechanisms by which subscribers may participate in actually playing a game with a game player whose feed they subscribe to. Manual techniques are typically employed. For example, a game player might use out-of-game communications such as texting and/or chat to communicate with subscribers in order to determine whether subscribers are eligible to play a game and, if so, coordinate their inclusion in and joining of the game. But such techniques have proven cumbersome, labor intensive, and slow.

Applicant discloses herein systems and methods that automate initiation of game sessions with streaming viewers or subscribers. In an example gaming environment, game participants use client devices to communicate with a gaming server and thereby engage in playing a game with each other. For example, a first game participant may use a first client device and a second game participant may use a second client device to communicate with an on-line video game server and communicate through the game server to play a game with each other. Persons register with a streaming server and request to view or subscribe to receive a streaming output of a particular game participant engaging in a particular game. For example, a person operating a third client device may communicate over a network with a streaming server in order to request to receive a stream of the play of the first game participant. In such a scenario, the person operating the third client device who has requested to receive the game stream may receive from the streaming server a streamed output of the game session between the first game participant and the second game participant.

In the scenario wherein persons are registered to receive a stream of output for game sessions by a particular game participant, the game participant may wish to have a person that is registered to receive a stream of the game output participate in an actual playing of the game. Applicants disclose herein systems and methods for automated initiation or establishment of game sessions with broadcast subscribers who, for purposes of this disclosure, may be any person that requests to view a game session and may be referred to interchangeably as either a viewer or subscriber. In an example embodiment, a participant who uses a first client node to play a video game via an on-line game server may select to invite one or more persons who are subscribers to the particular participant's game feed. For example, the game participant may wish to invite one or more friends who subscribe to the participant's game feed. In another scenario, the game participant may wish to invite one or more of numerous subscribers to the participant's game feed in order to further engage her subscribers. In an example embodiment, the game participant's game client interface is programmed to receive a request to initiate playing a game with one or more persons who are registered to receive streams of game output from the particular participant. The user interface may provide a mechanism to enter parameters relating to the request. For example, the user interface may allow the operator to specify the number of subscribers who may participate in the game session as well as any criteria for selecting subscribers from the entire universe of subscribers. The request to initiate a game session with one or more subscribers is communicated over a network to the game server.

The game server, which may also be referred to as a content item server, receives the request and responds to the request by creating a session identifier for the proposed game session. The game server communicates a request to initiate a game session with one or more subscribers to the streaming server. The request comprises information identifying the particular game player from who the request originated, the particular game to which the request applies, the particular session identifier created by the game server, and any additional information for designating parameters for the invitation such as, for example, the number of subscribers who may participate and the qualifications of those who may participate.

The streaming server determines the subscribers that are authorized to participate in the game play based upon the parameters defined in the request. In an example embodiment, the streaming server queries a database containing information about the subscribers in order to identify those subscribers that satisfy the parameters for inclusion in the game. For example, where the parameters associated with the request specify the invitation applies to one or more subscribers to a particular game player and a particular game, the streaming server queries the database to identify subscribers that subscribe to receive a stream output for the particular game player and the particular game. The streaming server may further determine whether the particular subscribers are registered to play the particular game. In some instances, the streaming server may determine that additional data may be needed in order to identify subscribers who may meet the specified criteria. For example, the request parameters may indicate the request applies to subscribers who are registered with the content item/game server to play the game and who play the game frequently. In such instances, the streaming server may request information about particular subscribers from the content item/game server. For example, in the scenario where the invitation applies only to person who play the game frequently, the streaming server may request information about the frequency with which a potential candidate plays the game.

Once the streaming server has identified subscribers that satisfy the parameters associated with the request, the streaming server prepares and transmits instructions for providing notice to the identified subscribers of the request. The instructions for providing notice may be any that are suitable including, for example, instructions to generate a user interface feature that provides notice of the request to engage in game play with the particular game player. The instructions are communicated to streaming clients that correspond to the subscribers that have been identified as authorized to join the game play session.

The streaming clients implement the instructions to provide notice of the request. For example, the streaming clients present a user interface that identifies the offer to participate in game play with the particular player and the particular game. A user interface feature such as, for example, a button may include on the interface so as to allow the particular streaming subscriber to accept the offer. If the user selects to accept the offer and requests to participate in the game, the request to participate is communicated to the streaming server.

In response to receiving requests to participate from the streaming clients, the streaming server communicates information identifying the particular subscriber individuals who have accepted to participate in the game play to the gaming server. In an example embodiment, streaming server communicates game account identifiers corresponding to the subscriber individuals.

In response to receiving the requests to participate in the games, the content item/game server creates a game session and associates with the game session the particular subscriber persons who have requested to participate. The content item/game server communicates information identifying the game session and details for accessing the session to the streaming server.

In response to receiving the game session information, the streaming server generates instructions for launching game clients at the client nodes of the subscribers who requested to participate in the game play. The instructions are communicated to the streaming server clients for each of the subscribers that has been designated to participate in the game session. At each streaming client that receives the instructions, the streaming client interfaces with the operating system to launch the game server client. The streaming server client provides commands to the game client to log the particular user into the game and place the user in a meeting location within the game for the particular game session.

Example Computing System

FIG. 1 is a diagram illustrating an example computing environment suitable for automated play session initiation with a subscriber. An example computing environment comprises server systems 100 and client systems or nodes 110A-E. Server systems 100 comprise content item server 140 and streaming server 170. Content item server 140 is programmed to provide content services such as gaming services to client devices. Streaming server 170 is programmed to store parameter values associated with users and client devices 110A-E for streaming output related to applications such as those that interact with content item server 140. Server systems 100 and client nodes 110A-E are programmed to communicate with one another, such as over one or more communication networks, including, for example, one or more local area networks (LAN's) and wide area networks (WAN's), such as the Internet. Server systems 100 may be distributed across any number of different servers and/or devices, at any number of different locations, which may themselves communicate over any number of different communications networks.

As shown in FIG. 1, client nodes 110A-C each include a respective content item client 111A-C which correspond to and communicates with content item server 140. Content item clients 111A-C and content item server 140 may collectively execute a content item. A content item may be any computing functionality which, in the example instance of FIG. 1, comprises a portion executing on content item server 140 and a portion executing on client devices 110A-C. In an example embodiment, the content item may be a massively multiplayer online (MMO) video game or other video game. In such an embodiment, content item server 140 is a game server and content item clients 111A-C are game client application instances.

Persons operating client devices 110A-C, who in the gaming context may be referred to as players or participants, log on or otherwise connect to the content item, i.e. video game, using content item clients 111A-C. In the example scenario depicted in FIG. 1, client 110A is operated by Participant A, client 110B is operated by Participant B, and client 110C is operated by Participant C. In an example embodiment, participants connect to the content item by providing, via content item clients 111A-C, identity and authentication information, such as a user name and password, which may be matched by server components 100 to an existing username and password for the participant.

In the scenario wherein the content item is a game, each content item client 111A-C may, on behalf of a respective player or participant, control a respective character or other participant-controlled entity within the content item. Each content item client 111A-C receives participant input information, such as may be provided though one or more user input components (e.g., touch screen, controller, camera, microphone, mouse, keyboard, etc.) at clients 110A-C. For example, participants may provide input for controlling respective characters, such as by performing various actions (e.g., firing a weapon, driving a car, moving from one location to another, etc.). Upon receiving the participant input information, content item clients 111A-C collect and forward content state data associated with the user input to the content item server 140.

Upon being received by content item server 140, incoming content state data from content item clients 111A-C may be provided to content state manager 146. Content state manager 146 generally perform operations related to communication of content item state among content item clients 111A-C. For example, in some cases, content state manager 146 may identify an update to content state data from one of content item clients 111A-C and then forward the update to each other content item client 111A-C, such that each of content item clients 111A-C are able to update and maintain respective versions of the state of the content item. For example, each of content item clients 111A-C may, in some cases, receive, from content state manager 146, updates regarding actions performed by other characters controlled by other content item clients 111A-C.

In addition to forwarding information about participant-controlled characters, content item server 140 may also provide, to content item clients 111A-C, information about other objects within a virtual area of the content item. For example, content item server 140 may provide information about objects such as trees, clouds, lakes, rivers, cliffs, birds, fish, animals, structures, vehicles, non-player characters (NPC's), and many other objects. The provided information may include, for example, any information associated with rendering of the objects at the respective clients 110A-C, such as location, orientation, size, color, texture, shading, lighting, reflectivity, associated audio data, and any other associated information.

Upon being received by content item clients 111A-C, the state, object, and other content item information from content item server 140 may be processed and then used to render image data, such as video data, associated with the content item. In particular, content item clients 111A-C may provide the received content item information to respective content rendering components 112A-C for rendering of image data, such as video data, associated with the content item. In greater detail, for example, content rendering components 112A-C may include one or more graphics processing units (GPU's) for rendering of image data, such as video data, as well as various audio processing components for processing and rendering of audio data. As should be appreciated, the GPU's and/or other image data processing components may perform various graphics rendering operations, such as geometry operations, shading, texturing, lighting, and other graphics pipeline operations. Upon being rendered, the image and audio data associated with the content item may be presented using one or more output devices (e.g., display screen, speakers, etc.).

Content item server 140 comprises database 150 in which is stored information relating to the services provided by content item server 140. For example, content item server 140 stores in content server database 150, data identifying individual accounts of players or participants who are registered to play the game service provided by content item server 140. In an example embodiment, content server database 150 may comprise a game account ID for each player that has account with content item server 140 along with information about the particular player such as number of games played, time spent playing, game scores, original date of joining, etc. Information relating to the particular game sessions including session identifiers and the participants or players assigned to each session are also captured and stored in content server database 150 by content item server 140. For example, content item server 140 may store in content server database 150 a session ID for each game session controlled by server 140 and store in relation to each session ID the account IDs of players assigned to or participating in the particular session.

FIG. 2 provides a graphical depiction of data that may be stored in an example embodiment of database 150. Game player table 210 comprises data relating to the persons or players who are registered to play a particular online game. As shown, player table 210 stores for each registered game player a game account ID 220 that is used to uniquely identify the player within the system. Game player table 210 further comprises for each registered game player, historical information about the game player relative to the system such as, for example, the following: start date 222 identifying the date the particular player joined the system; games played 224 identifying the total number of game sessions the particular player has participated in; game scores 226 identifying the scores achieved by the particular player; and time played 228 identifying the total elapsed time of play. Session table 230 comprises data relating to active or ongoing game sessions. As shown, session table 230 has recorded therein for each game session, a session ID 232 which uniquely identifies the game session within the system. Also recorded is a meeting area 234 which identifies a virtual meeting space or lobby where game players associated with the session may meet prior to the game playing. Session table 230 further comprises for each session ID, the game account ID's 236 of the game players who are participating in the particular game session. Score 238 and play time 240 are recorded for each participating player.

Streaming server 170 is adapted to stream output received from client nodes 110 to other client nodes. For example, in the scenario where a Participant A is operating a gaming application on device 110A, the output rendered on device 110A may be communicated to streaming server 170. Streaming sever 170 communicates the streamed output to client nodes that have requested or subscribed to receive the output from device 110A. In an example scenario wherein client nodes 110D and 110E have previously subscribed with streaming server 170 to receive output from Participant A executing a particular content item such as a particular game, streaming server 170 streams the output content stream received from client node 110A to nodes 110D and 110E. Streamed image and audio data received from streaming server 170 at client nodes 110D and 110E is presented to Participants D and E, respectively, by respective stream playback components 113D and E via output components, such as, for example, a display screen and audio speakers. Stream playback components 113C-E may include any components that are capable of playing streamed image and audio data, such as a web browser, various well-known video and/or audio players, and the like. It will be appreciated that client nodes 110 may have both a content item client 111 component and stream playback component 113. Accordingly, client nodes 110A-E may be used both to participate in a content item such as a game application, as well as view the output stream generated by a user participating in a content item.

As shown, streaming server 170 comprises streaming database 180 which is adapted to store data relating to the services provided by streaming server 170. For example, streaming database 180 is adapted to store data identifying persons who have subscribed to receive streaming output through streaming server 170. In an example embodiment, streaming server database 180 may comprise a streaming account ID for each person, i.e., subscriber, who has an account with streaming server 140 entitling the person to stream game output. Stored in relation to the streaming account ID for each subscriber are details regarding the particular game players and games for which the particular subscriber has subscribed to receive streamed output. For example, a particular subscriber's streaming account ID may have stored in relation to it gaming account IDs of the game players whose streams the particular subscriber is registered to receive along with the game IDs of the particular games for which streams may be received. Streaming server database 150 may further comprise for each person with a registered account, data identifying whether the particular person has an account to actually play the game which he or she is registered to stream. For example, streaming database 180 may have stored in relation to each person's streaming account ID, the game account IDs for any game server that the particular person is registered to play. Streaming database 180 may further have stored in relation to each person's streaming account ID, data relating to the use of the particular streaming service including, for example, the number of streaming sessions participated in, the period for which the particular subscriber has been a subscriber, and the particular streaming sessions the particular subscriber has received including the details of the game including the game players.

FIG. 3 provides a graphical depiction of data that may be stored in an example embodiment of database 180. As shown, streaming database 180 comprises a streaming subscriber table 310 that is used to store information about persons who are registered with the system to have output streamed to them. Streaming subscriber table 310 comprises for each registered streaming user, a streaming account ID 320 that is used to uniquely identify the streaming subscriber within the system. Streaming subscriber table 310 further comprises for each registered subscriber, information identifying historical information about the streaming engaged in by the particular subscriber such as, for example, the following: start date 322 identifying the date the particular subscriber joined the system; games streamed 324 identifying the total number of game sessions the particular subscriber has streamed; and time streamed 326 identifying the total elapsed time of streaming received by the particular subscriber.

Streaming database 180 further comprises related streaming information table 330 which is adapted to record information relating to streaming of particular games by the streaming subscribers. As shown, streaming information table 330 comprises for each streaming subscriber, who is identified by a streaming account ID 332, a game ID 334 which identifies a game the particular subscriber is registered to stream. Also specified are a game account ID 336 which corresponds to the particular game player whose output feed is to be streamed. Session ID 338 corresponds to the particular game session that is being streamed. Streaming information table 330 still further comprises information about the particular streaming subscriber's involvement with the particular game as a game player. For example, where the particular subscriber is registered to play the game being streamed, streaming information table 330 identifies the streaming subscriber game account ID 340 and an indication of whether or not the game client has been installed by the subscriber 342.

Content item server 140 and streaming server 170 are programmed to provide automated initiation of game sessions between a game player and subscribers to the game player's streamed output. In an example embodiment, content item server 140 receives a request to initiate a game session from a particular game player such as Participant A at client node 110A. Content item server 140 communicates the request to streaming server 170 which references database 180 to identify streaming subscribers who receive streaming output of games played by Participant A. Streaming server 170 communicates a notification to the streaming client for the identified streaming subscribers. In response to receiving acceptances from particular subscribers, streaming server 170 communicates information identifying the accepting subscribers to the game server which creates a game session and adds the accepting subscribers to the game session. Streaming server 170 communicates instructions to the streaming clients of the accepting subscribers to launch game clients and log in the subscribers to the designated game session.

Example Game Session Initiation Processing

FIGS. 4A-E depict a diagram of example processing for initiating a game session between a game participant and one or more stream subscribers. As shown in FIGS. 4A-E, headings are provided identifying "Game Client Operations," "Game Server Operations," Streaming Server Operations, and "Streaming Client Operations." Operations that are performed by each of the game clients 110A-C, content item/game server 140, streaming server 170, and streaming clients 110D-E are arranged under the corresponding heading.

Figure 4A:
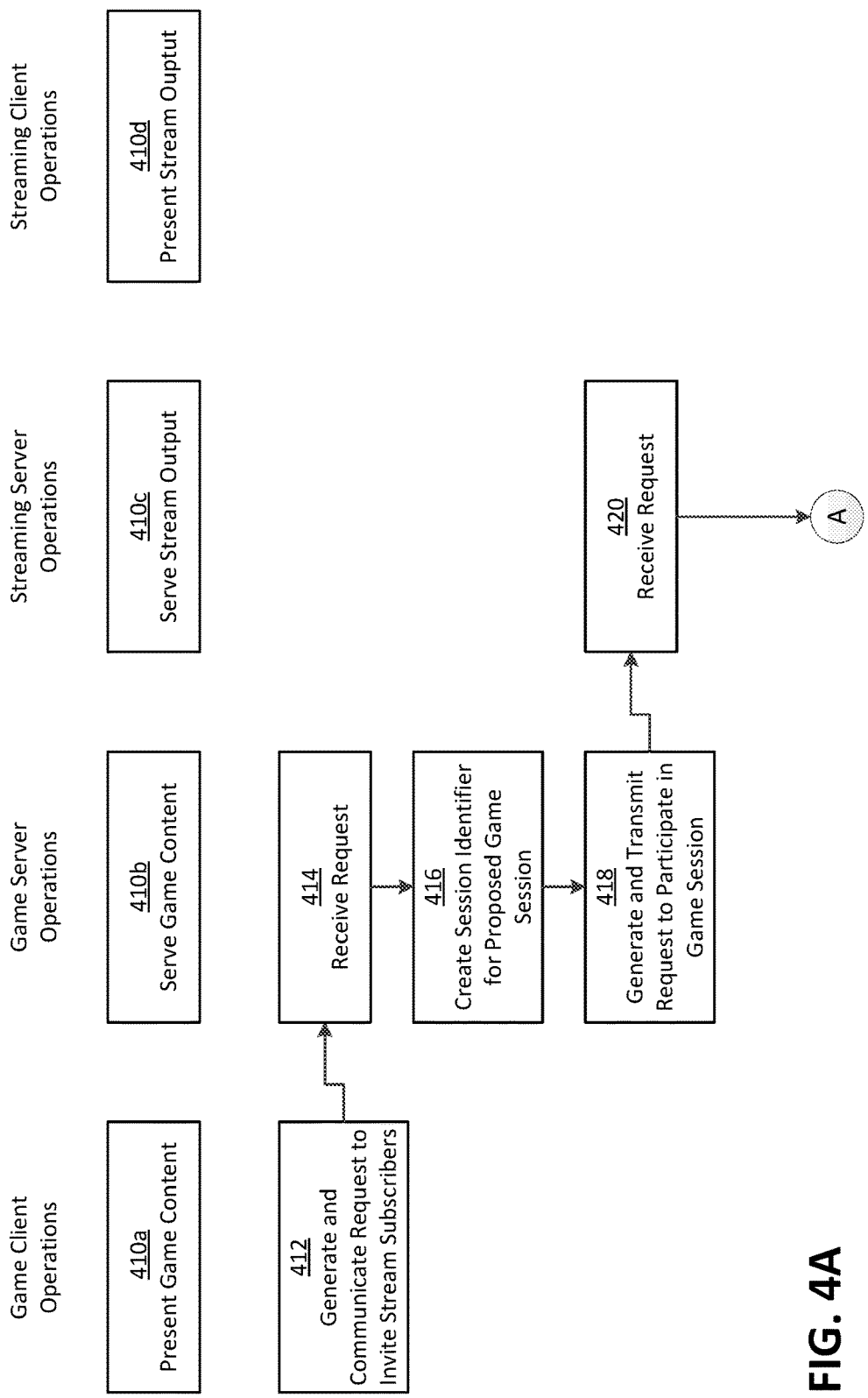
FIGS. 4A-E depict a flow diagram of example processing for initiating a game session with output subscribers.
Figure 4B:
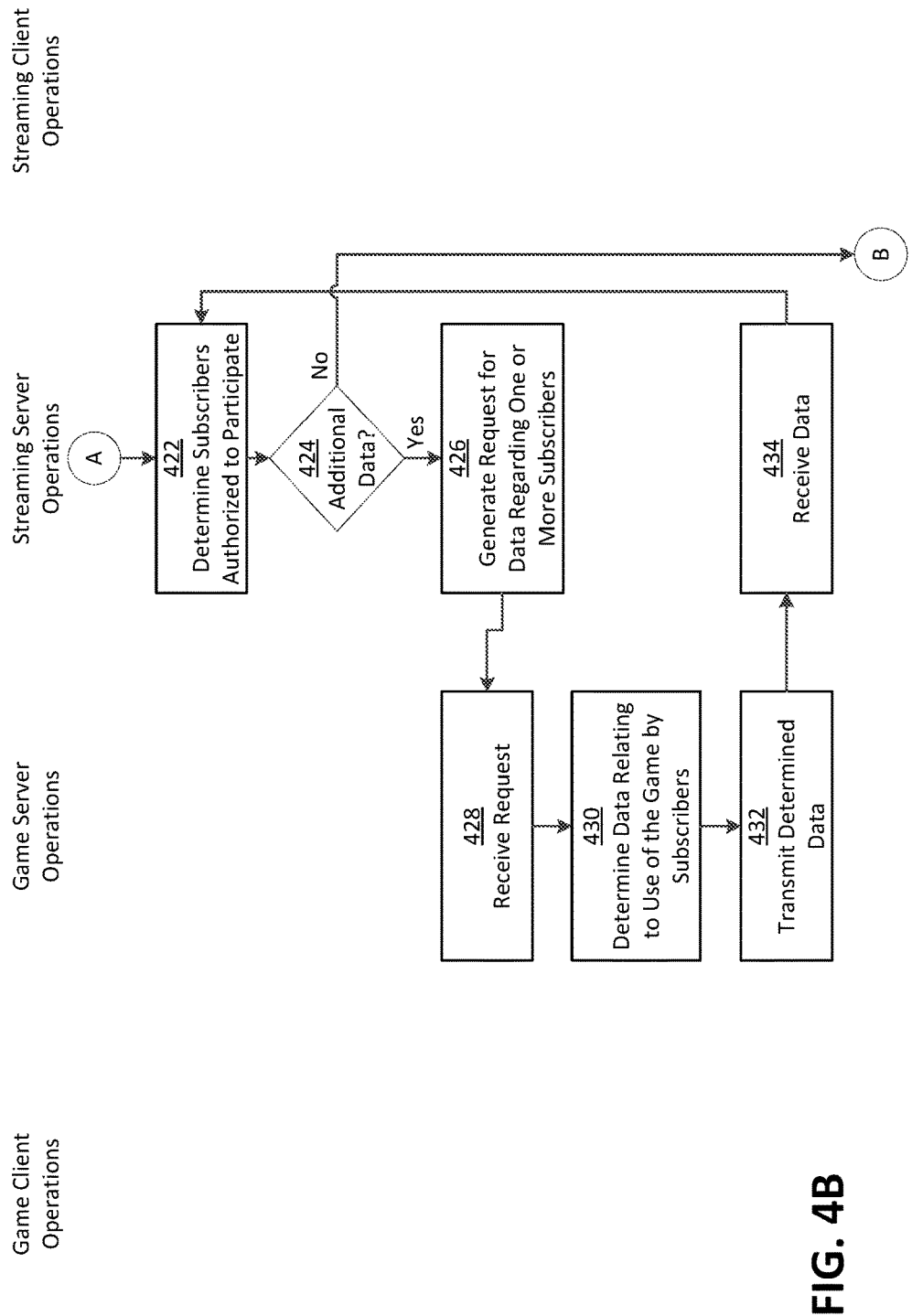
Figure 4C:
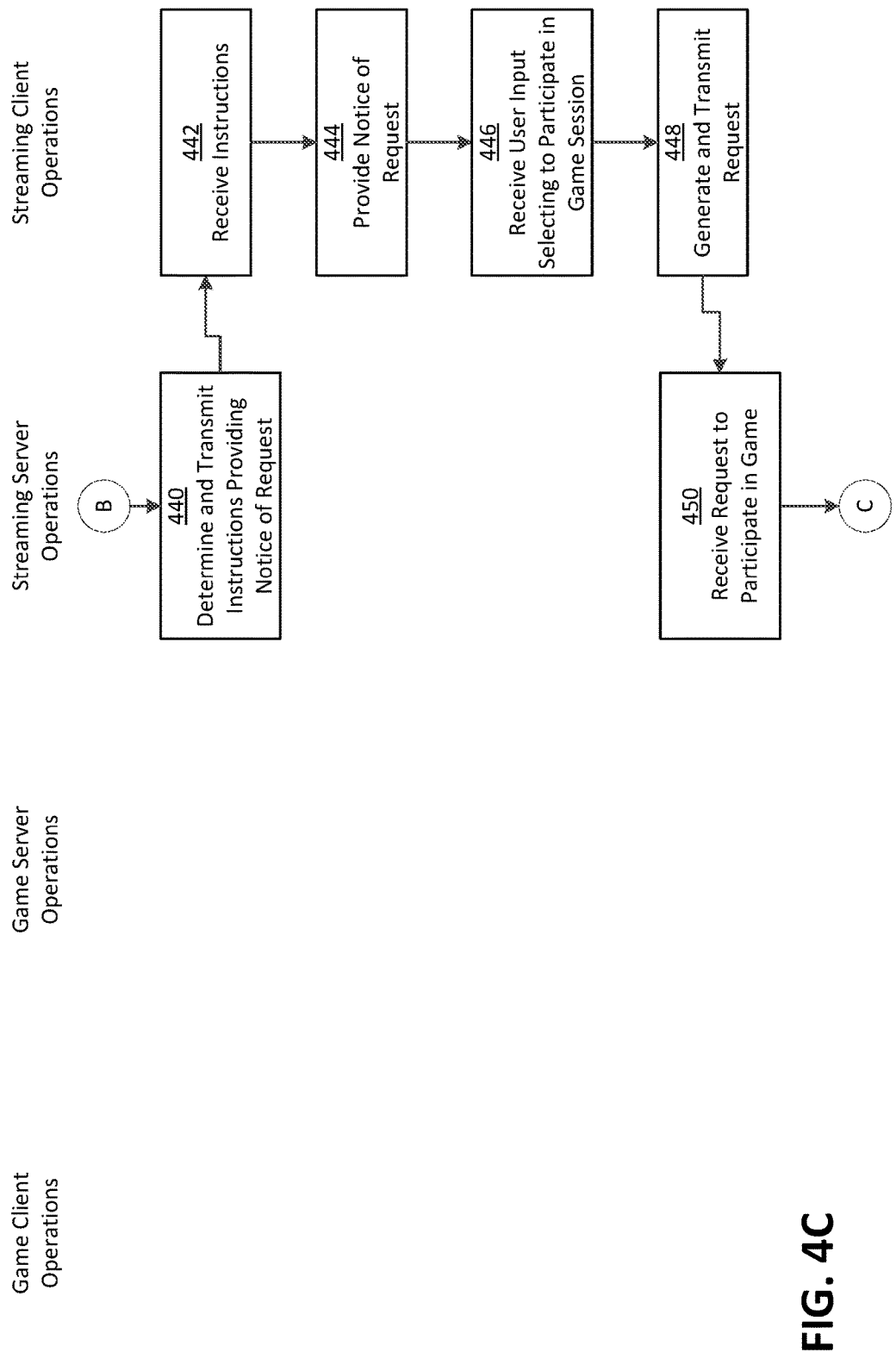
Figure 4D:
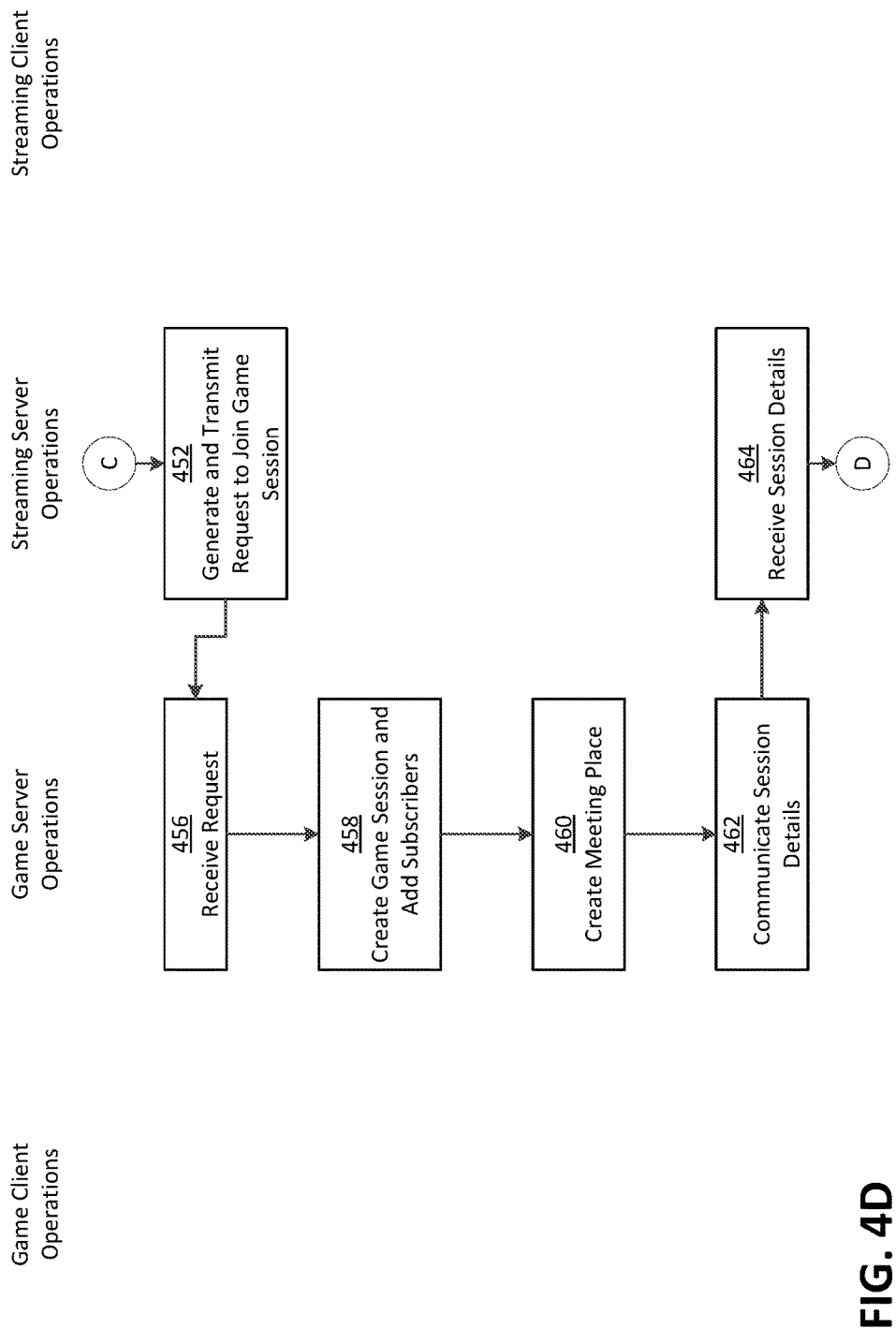
Figure 4E:
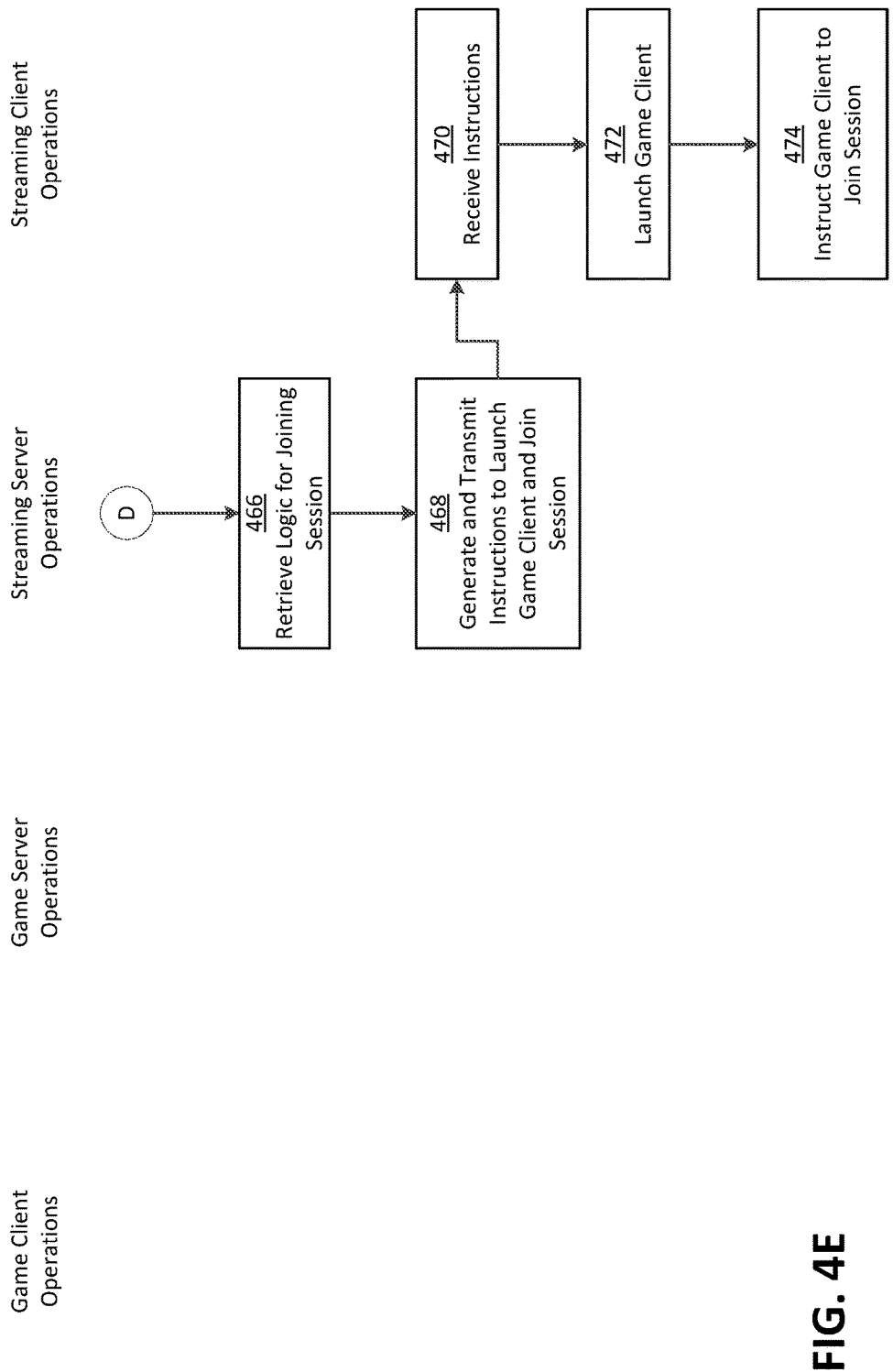

Referring to FIG. 4A, blocks 410*a-d* indicate that for purposes of an initial state, each of game client nodes 110A-C, content item server 140, streaming server 170, and streaming clients 110D-E perform operations typical of their intended use. For example, client nodes 110A-C may be operated by game participants to play a video game while content item server 140 servers video game content to nodes 110A-C. Streaming server 170 receives streams of game content from one or more of clients 110A-C and streams the content to one or more of client systems 110D-E. Streaming client nodes 110D-E interface with streaming server 170 to receive the streamed game play content.

At block 412, game client 110A generates and transmits a request to invite stream subscribers to participate in a game with Participant A operating client node 110A. In an example scenario, a game participant such as, for example, Participant A who operates client node 110A, and in particular content item client 111A, to play a video games, may wish to have a person, e.g., Participant D, that is registered to receive a stream of the game output participate in an actual playing of the game. For example, Participant A may wish to invite one or more friends who subscribe to the participant's game feed. In another scenario, Participant A may wish to invite one or more of numerous subscribers to the participant's game feed in order to further engage her subscribers. In an example embodiment, client interface 111A, which is a game client interface, is programmed to receive input from Participant A to initiate a game session with one or more subscribers who are registered to receive streams of game output from Participant A. Game client interface 111A may provide a mechanism to enter parameters relating to the request. For example, game client interface 111A may allow the operator to specify the number of subscribers who may participate in the game session as well as any criteria for selecting subscribers from the entire universe of subscribers. The request to initiate a game session with one or more subscribers is communicated to content item server 140.

At block 414, content item server 140 receives the request and, at block 416, responds to the request by creating a session identifier for the proposed game session. The session identifier, which may be referred to as a session ID, may be unique to the proposed game session between the requesting game player, e.g., Participant A, and the subscribers who qualify and elect to participate. At block 418, content item server 140 generates and communicates a request to initiate a game session with one or more subscribers to the streaming server. The request comprises information identifying the particular game player from whom the request originated, the particular game to which the request applies, the particular session identifier created by the game server, and any additional information for designating parameters for the invitation such as, for example, the number of subscribers who may participate and the qualifications or characteristics of those who may participate. In an example embodiment, the request may comprise a game player account identifier (game account ID) identifying the requesting game player, a game identifier (game ID) identifying the particular game to which the request applies, and a session identifier (session ID) identifying the newly created session. Information identifying parameters, qualifications, or characteristics of subscribers who may participate may include, for example, that the subscriber is registered to play the particular game and further has a particular history of playing the game that meets certain criteria. For example, the specified characteristics may specify one or more of the following: length of time having account for playing the game; proficiency at playing the game as dictated, for example, by game scores; and length of time that the person has subscribed to receive broadcasts of the game.

At block 420, the request to engage in a game playing session is received at streaming server 170. At block 422, streaming server 170 determines the subscribers that are authorized to participate in the game play based upon the parameters defined in the request. In other words, streaming server 170 determines whether the characteristics of a particular subscriber satisfy the parameters or characteristics specified in the request. In an example embodiment, streaming server 170 queries database 180 containing information about the subscribers in order to identify those subscribers that satisfy the parameters for inclusion in the game. For example, where the parameters associated with the request specify that the invitation applies to subscribers to a particular game player and a particular game, streaming server 170 queries database 180 to identify subscribers that subscribe to receive a stream output for the particular game player and the particular game. Streaming server 170 may further query database 180 to determine whether the subscribers are registered to play the particular game to which the offer applies. For example, streaming server 170 may query database 180 to determine if the potential subscribers have a game account ID used to play the particular game. Still further, streaming server 170 may further determine whether or not the subscribers have the game client installed thereon.

In some instances, and as shown at decision block 424, streaming server 170 may determine that additional data may be needed in order to identify subscribers who may meet parameters or criteria specified in the request received from content server 140. For example, the request parameters may indicate the request applies to subscribers who are registered with content item server 140 to play a particular game and whose play of the game meets certain criteria. For example, the invitation to play the game may only apply to persons who frequently play the game, who have achieved a particular level of competence, i.e., score, who have been players for a particular length of time, etc. Streaming server 170 may determine that it does not have data sufficient to evaluate the subscribers. In particular, streaming server 170 may not have information regarding use of the online game by each of one or more subscribers. In such an instance, at block 426, streaming server 170 may generate and transmit a request for data regarding one or more subscribers for whom additional data may be useful. The request for additional information may comprise any information needed to retrieve the requested data. For example, streaming server 170 may determine and include in the request, the game account identifier employed within content item server 140 and corresponding to each of the one or more steaming subscribers for whom information is being requested.

At block 428, content item server 140 receives the request. At block 430, content item server 140 determines the data responsive to the request. In an example embodiment, content item server 140 queries database 150 to retrieve information. For example, where the request seeks the scores made by one or more players associated with a particular account or game player identifiers, content item server 140 queries database 150 for data relating to the particular account or game player identifiers. At block 432, content item server 140 transmits the retrieved data. In the transmitted data, the persons to whom the data applies may be identified using the corresponding game player account and/or game player identifier.

At block 434, streaming server 234 receives the data. In an example embodiment, the received data comprises data regarding the use of the game by the particular subscribers for whom the request for additional data was made. In the event the responsive information refers to persons by game account identifiers, streaming server 234 uses data in database 180 to identify the corresponding subscriber identifying information.

Processing continues at block 422 where streaming server 234 uses the additional data to identify the particular subscribers who satisfy the parameters or characteristics specified in the request received from content item server 140.

At block 440, streaming server 170 generates and transmits instructions to provide notice of the request to the identified subscribers. The instructions to provide notice may be any that are suitable including, for example, instructions to generate a user interface feature that provides notice of the request to engage in game play with the particular game player. The instructions are communicated to streaming clients that correspond to the subscribers that have been identified as authorized to join the game play session. In an example scenario, the instructions may be transmitted to client devices 110D and 110E which may correspond to subscribers identified at block 422.

At block 442, the client devices receive the instructions. In an example scenario, the instructions are received at streaming clients 113D and 113E operating on client devices 110D and 110E respectively.

At block 444, the client devices execute the instructions to provide notice of the request to participate in a game session. In an example embodiment, streaming clients 113D and 113E generate a user interface feature that provides notice of the request to enter into a game session. In an example embodiment, the user interface feature identifies the offer, the particular game to which applies, and the particular player from whom the offer was received. Streaming clients 113D and 113E may create a visual user interface output feature that provides notice of the request. In another example, streaming clients 113D and 113E may create an audible output feature that provides notice of the invitation.

At block 446, streaming clients 113D and 113E receive user input selecting to participate in the game session. A user interface feature such as, for example, a button may be included on the interface so as to allow the particular streaming subscriber to accept the offer. If the user selects to accept the offer and requests to participate in the game, at block 448, a request to accept the offer and participate or join the game play is generated and communicated to streaming server 170.

At block 450, the request to accept the offer is received at streaming server 170. Processing continues at block 452 where streaming server 170 generates and transmits a request to join the game session. The request to join the game session comprises any information needed to provide proper notice. In an example embodiment, a request may comprise for each subscriber that has been identified to participate in the game session, the game account number used within content item server 140 to identify the particular subscriber.

At block 456, the request to join the proposed game session is received by content item server 140. At block 458, content item server 140 associates the particular subscribers/players with the game session. In an example embodiment, content item server 140 updates database 150 with information associating account numbers or player identifiers with the session identifier.

At block 460, content item server 140 identifies or creates a meeting place for the particular session. In connection with on-line games, it is common practice to provide a virtual space where game players can view information about an upcoming game session prior to the session beginning. Such virtual spaces are referred to by various different names including, for example a "lobby." At block 460, content item server 140 defines a new lobby including creating a new lobby object identifier, and stores in database an indication of the account numbers or player identifiers associated with the particular lobby.

At block 462, content item server 140 communicates relevant details regarding the game session. The communication comprises any information that may be needed in order for the identified subscribers to actually join the game session. In an example embodiment, the information may comprise: an identifier of the game, e.g., game ID; an identifier of the game player originating the session, e.g., game account ID; the session identifier, e.g., session ID; and an identifier of the meeting place designated by content item server 140, e.g., meeting area ID.

At block 464, the details regarding the session are received at streaming sever 170. At block 466, streaming server 170 retrieves logic for joining the session and meeting place identified in the received session details. In an example embodiment, streaming server 170 may query database 180 for details regarding logging into the particular game identified in the game session and accessing a meeting place within the particular game. The information may specify particular application programming interface calls that should be made to the game client in order to have the game client log into the game and access a meeting space.

At block 468, streaming server 170 generates and transmits instructions to the streaming client 113. In an example scenario, the instructions indicate to the streaming client to launch a game client 112 corresponding to the particular game, log into the particular game, and access a meeting location for the particular game session. It will be appreciated that where more than one subscriber has been identified to join the game, instructions are sent to the client devices 110 corresponding to each identified subscriber.

At block 470, streaming clients, e.g., 113D and 113E, that corresponding to the identified subscribers receive the instructions. At block 472, streaming clients 113D and 113E implement the instructions and cause corresponding game clients to be launched. For example, each of streaming clients 113D and 113E may make a call to the operating system executing on the particular node 110 and request that a game client 111 is launched.

At block 474, each of streaming clients 113D and 113E make calls to the game client using an application programming interface to log the relevant subscriber into the relevant game session and to access the meeting place specified in the information received from content item server 140. Thereafter, subscribers at client devices 110D and 110E may participate in the game session with Participant A who originated the request for the game session.

It will be appreciated that if a subscriber who has requested to participate in the game session should change her mind, streaming server 170 may communicate a request to remove the particular subscriber from the session to content item server 140 which updates content item database 150 to remove the particular subscriber from the game session. In response to one subscriber being removed from a game session, a place may become available for another subscriber. Accordingly, streaming server 170 may again transmit information inviting subscribers to participate. If another subscriber requests to join the game session, streaming server 170 communicates account information for the newly requesting subscriber to content item server 140. Content item server 140 updates database 150 to associate the new subscriber to the game session.

Example Processing Architecture

Figure 5:
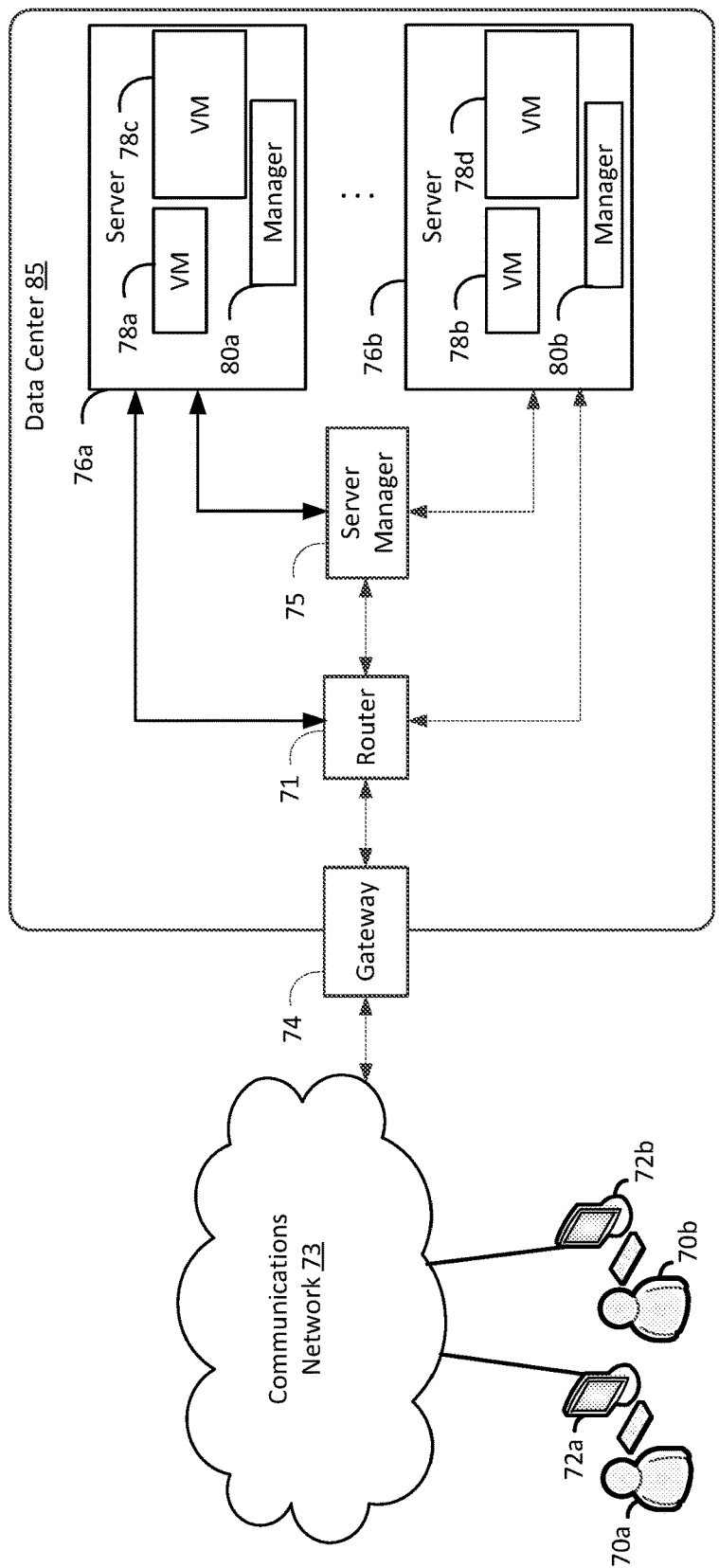
FIG. 5 depicts an example computing arrangement for implementing network accessible services.

It will be appreciated that the processing described in connection with FIGS. 4A-E may be comprised in a system architecture adapted to provide web services or cloud based services. Client nodes 110A-E may access the server systems 140 and 170 via any suitable networking system which may comprise the Internet and/or World Wide Web. FIG. 5 depicts an example operating environment suitable for providing on-line services such as those described herein in connection with servers 140 and 170.

FIG. 5 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). In an example embodiment, virtual machine instances 78c and 78d may be instances of content item server 140 and/or streaming content server 170. The virtual machine instances 78c and 78d may be configured to perform all, or any portion, of the techniques for providing content items such as gaming services and/or streaming services and/or any other of the disclosed techniques in accordance with the present disclosure and described in detail above. As should be appreciated, while the particular example illustrated in FIG. 5 includes one virtual machine in each server, this is merely an example. A server may include more than one virtual machine or may not include any virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 5 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 5, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 5, a server manager 75 is also employed to at least in part direct various communications to, from and/or between servers 76*a* and 76*b*. While FIG. 5 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 85 described in FIG. 5 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 6:
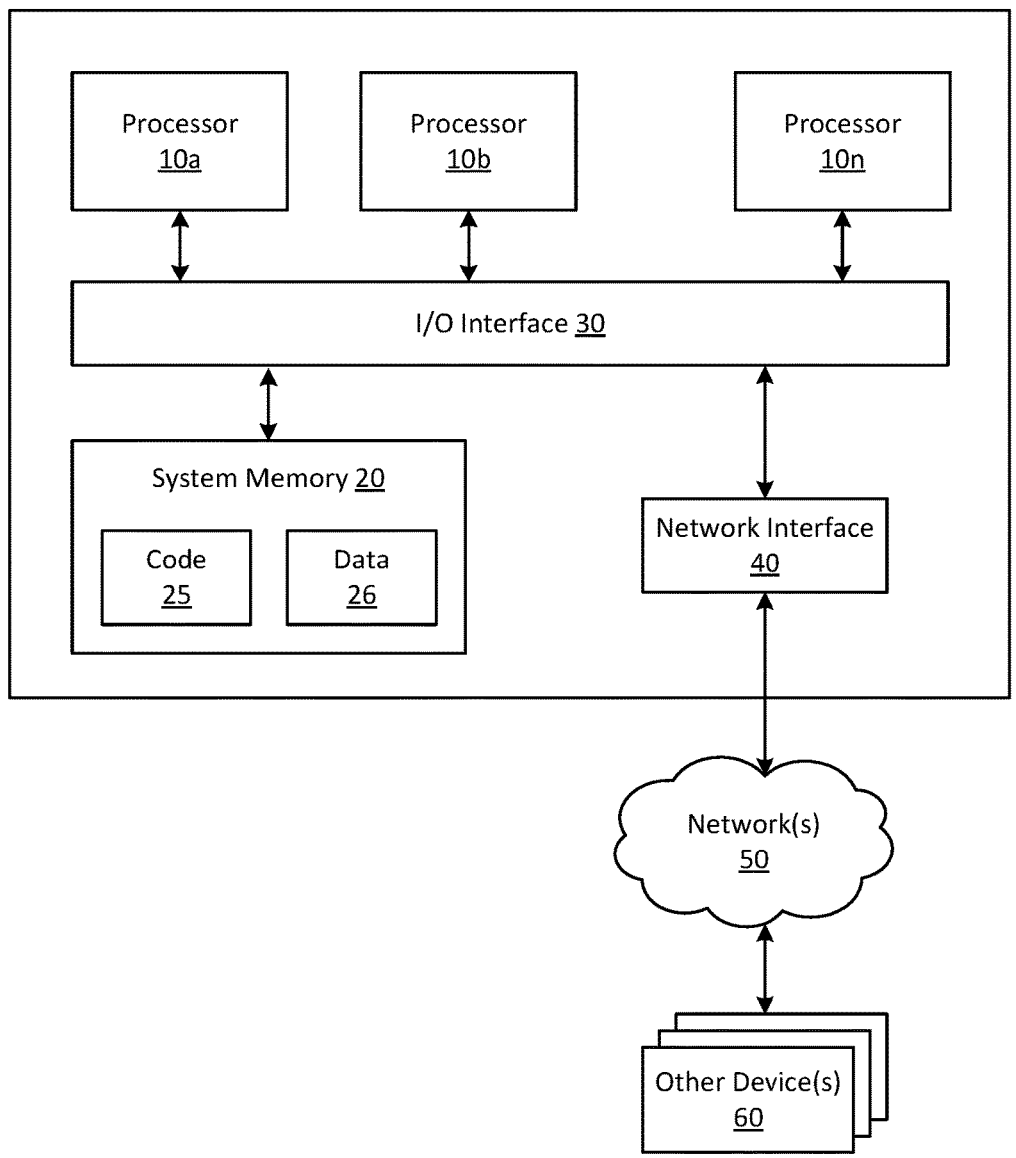
FIG. 6 depicts an example computing system.

In at least some embodiments, client nodes 110A-E and servers such as servers 140 and 170 that implement a portion or all of one or more of the technologies described herein may include a computer system that includes or is configured to access one or more computer-accessible media. FIG. 6 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
a game server, the game server programmed to perform operations comprising:
serving video game content for an online game to a plurality of game clients;
receiving from a game client a request to invite one or more subscribers to a content stream of the online game to participate in a game session; and
transmitting a request for subscribers to participate in a session of the online game, the request for subscribers comprising a game identifier identifying a game, a game session identifier identifying a game session, and information identifying characteristics of subscribers; and
a broadcast streaming server, the broadcast streaming server programmed to perform operations comprising:
serving a content stream of the online game to a plurality of streaming server clients;
receiving the request for subscribers to participate in a session of the online game;
determining a subscriber who is authorized to participate in the game session based at least in part on the game identifier and the identified characteristics;
transmitting to a user node having a streaming server client executing thereon associated with the subscriber who is authorized to participate in the game session, instructions to provide notice of the request for subscribers to participate in the game session;
receiving from the streaming server client associated with the subscriber who is authorized to participate in the game session a request to join the game session;
transmitting to the game server a request to join the game session, the request to join the game session comprising information identifying the subscriber who is authorized to participate in the game session;
determining instructions for launching a game client at the user node and for accessing the game session using the game client; and
transmitting to the user node the game session identifier identifying the game session and the determined instructions for launching a game client at the user node and for accessing the game session using the game client.

2. The system of claim 1,
wherein determining a subscriber who is authorized to participate in the game session based at least in part on the game identifier and the identified characteristics comprises determining the subscriber is a player of a game associated with the game identifier and the subscriber satisfies the identified characteristics.

3. The system of claim 2,
wherein determining a subscriber who is authorized to participate in the game session further comprises generating and transmitting a request to the game server for data regarding one or more subscribers, the request for data regarding one or more subscribers comprising identifiers for the one or more subscribers;

wherein the game server is programmed to perform operations further comprising:

receiving the request for data regarding one or more subscribers;

determining using the identifiers for each of the one or more subscribers data relating to use of the online game by each of the one or more subscribers;

transmitting to the streaming server the determined data relating to use of the online game by each of the one or more subscribers.

4. The system of claim 3, wherein the streaming server is programmed to perform operations further comprising:

receiving from the game server the data relating to use of the online game by each of the one or more subscribers; and evaluating the data relating to use of the online game by each of the one or more subscribers relative to the information identifying characteristics of subscribers.

5. A method, comprising:

receiving, at a broadcast streaming server, a request from a game server for viewers to participate in a game session, the request for viewers comprising a game identifier identifying a game and a game session identifier identifying a game session;

determining, at the broadcast streaming server, based at least in part on the game identifier, a viewer who is authorized to participate in the game session;

transmitting, at the broadcast streaming server, to a user node associated with the viewer who is authorized to participate in the game session, instructions to provide notice of the request for viewers to participate in the game session;

receiving, at the broadcast streaming server, a request to join the game session;

transmitting, at the broadcast streaming server, to the game server a request to join the game session, the request to join the game session comprising information identifying the viewer who is authorized to participate in the game session; and transmitting, at the broadcast streaming server, to the user node instructions for launching a game client at the user node and accessing the game session using the game client.

6. The method of claim 5, wherein determining at the broadcast streaming server the viewer who is authorized to participate in the game session comprises determining a viewer who is registered to play the game and who has installed the game.

7. The method of claim 6, wherein determining the viewer who is registered to play the game comprises determining a viewer who has an associated game identifier.

8. The method of claim 7, wherein the associated game identifier is an account number.

9. The method of claim 5, wherein the request for viewers further comprises information identifying characteristics of viewers, and wherein determining a viewer who is authorized to participate in the game session comprises determining that the viewer satisfies the identified characteristics.

10. The method of claim 9, wherein the information identifying characteristics of viewers comprises information identifying one or more of: length of time having an account for playing the game; proficiency at playing the game; and a length of time subscribing to receive broadcast output of the game.

11. The method of claim 10, wherein determining a viewer who is authorized to participate in the game session comprises:

the broadcast streaming server generating and transmitting a request to the game server for data regarding one or more viewers, the request for data regarding one or more viewers comprising identifiers for each of the one or more viewers;

receiving from the game server data regarding one or more viewers; and evaluating the received data regarding one or more viewers relative to the information identifying characteristics of viewers.

12. The method of claim 5, wherein transmitting instructions to provide notice of the request for viewers to participate in the game session comprises transmitting instructions to generate a user interface providing notice of the request for viewers to participate in the game session.

13. The method of claim 12, wherein transmitting instructions to generate a user interface providing notice of the request for viewers to participate in the game session comprises transmitting instructions to generate a user interface with a user interface feature adapted to receive user input requesting to participate in the game session.

14. The method of claim 13, wherein receiving from the user node associated with the viewer who is authorized to participate in the game session a request to join the game session comprises receiving an indication a user has activated the user interface feature adapted to receive user input requesting to participate in the game session.

15. The method of claim 5, further comprising querying a database for instructions associated with the game identifier identifying the game.

16. The method of claim 5, wherein transmitting instructions indicating to provide notice of the request for viewers to participate in the game session comprises transmitting instructions to a client application of the broadcast streaming server.

17. One or more non-transitory computer-readable storage media having stored thereon instructions that, upon execution on at least one computing node of a plurality of computing nodes, cause the at least one computing node to perform operations comprising:

serving video game content for an online game to a plurality of game clients;

receiving from a game client a request to invite one or more subscribers to a content stream of the online game to participate in a game session;

transmitting to a streaming server a request for subscribers to participate in a game session of the online game, the request for subscribers comprising a game identifier and a game session identifier;

receiving from the streaming server a request to join the game session, the request to join the game session comprising information identifying at least one subscriber who is authorized to participate in the game session, the identified at least one subscriber identified by the streaming server at least in part based upon on characteristics associated with the identified at least one subscriber relating to streaming of the online game; and adding the at least one subscriber to the game session.

18. The one or more non-transitory computer-readable storage media of claim 17, the operations further comprising:
- receiving a request for data regarding one or more subscribers, the request for data regarding one or more subscribers comprising identifiers for each of the one or more subscribers;
- determining using the identifiers for each of the one or more subscribers data relating to use of the online game by each of the one or more subscribers; and
- transmitting to the streaming server the determined data relating to use of the online game by each of the one or more subscribers.

19. The one or more non-transitory computer-readable storage media of claim 17, the operations further comprising:
- based at least in part on receiving from the streaming server a request to join the game session, creating a virtual meeting place associated with the game session.

20. The one or more non-transitory computer-readable storage media of claim 17, wherein the request for subscribers to participate in a session of the online game comprises a game player identifier identifying a player who originated the request for subscribers to participate in a game session.

* * * * *